United States Patent
Park

(10) Patent No.: US 10,416,908 B2
(45) Date of Patent: Sep. 17, 2019

(54) MEMORY SYSTEM AND METHOD FOR DETECTING ERROR SECTION AND REPROCESSING TASKS

(71) Applicant: SK hynix Inc., Gyeonggi-do (KR)

(72) Inventor: Jeen Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 120 days.

(21) Appl. No.: 15/635,291

(22) Filed: Jun. 28, 2017

(65) Prior Publication Data

US 2018/0150247 A1    May 31, 2018

(30) Foreign Application Priority Data

Nov. 30, 2016  (KR) .................. 10-2016-0161928

(51) Int. Cl.
    *G06F 3/06*        (2006.01)
    *G06F 11/07*       (2006.01)

(52) U.S. Cl.
    CPC ............ *G06F 3/0619* (2013.01); *G06F 3/065* (2013.01); *G06F 3/067* (2013.01); *G06F 3/0659* (2013.01); *G06F 11/073* (2013.01); *G06F 11/079* (2013.01); *G06F 11/0793* (2013.01)

(58) Field of Classification Search
    CPC ........ G06F 3/0619; G06F 3/065; G06F 3/067; G06F 3/0653; G06F 3/0658; G06F 3/0659; G06F 3/0683; G06F 3/0685; G06F 11/07
    See application file for complete search history.

(56) References Cited

U.S. PATENT DOCUMENTS

| 6,701,393 B1* | 3/2004 | Kemeny ............... G06F 12/122 710/40 |
| 9,400,894 B1* | 7/2016 | Telang ................... G06F 21/64 |
| 2013/0019130 A1* | 1/2013 | Hakhumyan ........... G06F 11/27 714/718 |
| 2013/0067179 A1 | 3/2013 | Paleologu et al. |
| 2013/0166855 A1* | 6/2013 | Batwara ................ G06F 3/0608 711/154 |

FOREIGN PATENT DOCUMENTS

KR        101121924        3/2012

* cited by examiner

*Primary Examiner* — Michael Krofcheck
(74) *Attorney, Agent, or Firm* — IP & T Group LLP

(57) ABSTRACT

Provided herein may be a memory system and a method of operating the memory system. The memory system may include a semiconductor device in which data are stored, and a memory controller for communicating with the semiconductor device, sequentially processing tasks included in a descriptor, detecting an error section by checking the tasks in reverse order when an error occurred in the tasks, and reprocessing the tasks included in the detected error section.

18 Claims, 9 Drawing Sheets

| Descriptor | | |
|---|---|---|
| SC | TC | PC |
| S1 | T3 | P1 |
| S2 | T1 | P2 |
| S3 | T2 | P1 |
| S4 | T6 | P2 |
| S5 | T5 | P1 |
| S6 | T4 | P2 |

| Descriptor | | |
|---|---|---|
| SC | TC | PC |
| S1 | T3 | P1 |
| S2 | T1 | P2 |
| S3 | T2 | P1 |
| S4 | T6 | P2 |
| S5 | T5 | P1 |
| S6 | T4 | P2 |

← EC1
← EC2(Co_C1)
ERROR ⇒
← EC3(Cu_C1)

FIG. 11

| Descriptor | | |
|---|---|---|
| SC | TC | PC |
| ⋮ | ⋮ | ⋮ |
| S10 | T20 | P1 |
| S11 | T21 | P2 |
| S12 | T22 | P3 |
| S13 | T23 | P4 |
| S14 | T24 | P5 |
| S15 | T25 | P8 |
| S16 | T26 | P5 |
| S17 | T27 | P2 |
| S18 | T28 | P3 |
| ⋮ | ⋮ | ⋮ |

ECa(Co_Cc) — top
ECb(Cu_Cc) — bottom
ERROR ⇒

FIG. 12

| Descriptor | | |
|---|---|---|
| SC | TC | PC |
| ⋮ | ⋮ | ⋮ |
| S10 | T20 | P1 |
| S11 | T21 | P2 |
| S12 | T22 | P3 |
| S13 | T23 | P4 |
| S14 | T24 | (P5) —— 122 |
| S15 | T25 | P8 |
| S16 | T26 | (P5) —— 121 |
| S17 | T27 | P2 |
| S18 | T28 | P3 |
| ⋮ | ⋮ | ⋮ |

NO / EO
ECa(Co_Cc) — top
ECb(Cu_Cc) — bottom

FIG. 13

| Descriptor | | |
|---|---|---|
| SC | TC | PC |
| ⋮ | ⋮ | ⋮ |
| S10 | T20 | P1 |
| S11 | T21 | P2 |
| S12 | T22 | P3 |
| S13 | T23 | P4 |
| S14 | T24 | (P5) |
| S15 | T25 | P6 |
| S16 | T26 | P7 |
| S17 | T27 | P8 |
| S18 | T28 | P9 |
| ⋮ | ⋮ | ⋮ |

← ECa(Co_Cc)

---122

← ECb(Cu_Cc)

↓

(Co_Cd)

EO: S15–S18

MEMORY SYSTEM AND METHOD FOR DETECTING ERROR SECTION AND REPROCESSING TASKS

CROSS-REFERENCE TO RELATED APPLICATION

The present application claims priority under 35 U.S.C. § 119(a) to Korean patent application number 10-2016-0161928 filed on Nov. 30, 2016 in the Korean Intellectual Property Office, the entire disclosure of which is incorporated herein by reference.

BACKGROUND

Field of Invention

Various embodiments of the present disclosure generally relate to a memory system and a method for operating the memory system, and more particularly, to a memory system for executing a descriptor and a method for operating the memory system.

Description of Related Art

Generally, a memory system is widely being used as a data storage device for digital devices such as computers, digital cameras, MP3 players and smart phones. Such a memory system may include a semiconductor device in which data are stored and a memory controller for controlling the semiconductor device. If a digital device is a host, a memory controller may transmit various kinds of information, including commands and data, between the host and a memory device.

Recently, due to the improvement of the portability of digital devices, the amount of data usage has also increased. Due to the increase of the amount of data, a semiconductor device may include multiple memory devices. With the increase in the number of memory devices, a memory controller may execute a descriptor in which various tasks are included.

SUMMARY

Various embodiments of the present disclosure are directed to a memory system and a method for operating the memory system, which may quickly detect an error section when an error occurred during the execution of a descriptor, and which may reprocess tasks included in the detected error section.

An embodiment of the present disclosure may provide for a memory system. The memory system may include a semiconductor device in which data are stored and a memory controller for communicating with the semiconductor device, sequentially processing tasks included in a descriptor, detecting an error section by checking the tasks in reverse order when an error occurred in the tasks, and reprocessing the tasks included in the detected error section.

An embodiment of the present disclosure may provide for a method of operating a memory system. The method may include determining a processing sequence of tasks included in a descriptor, processing the tasks according to the processing sequence, checking whether an error occurred when all of the tasks are processed, detecting an error section by checking the tasks in reverse order of the processing sequence when it is determined that an error occurred, and reprocessing the tasks included in the error section according to the processing sequence.

BRIEF DESCRIPTION OF THE DRAWINGS

FIG. 7 is a view for explaining an operation of processing tasks of a descriptor in FIG. 5.

FIG. 8 is a view for explaining a case in which an error occurs during processing tasks of a descriptor in FIG. 5.

FIGS. 11 to 13 are views for explaining a method for operating a memory system according to an embodiment of the present disclosure.

DETAILED DESCRIPTION

Figure 1:
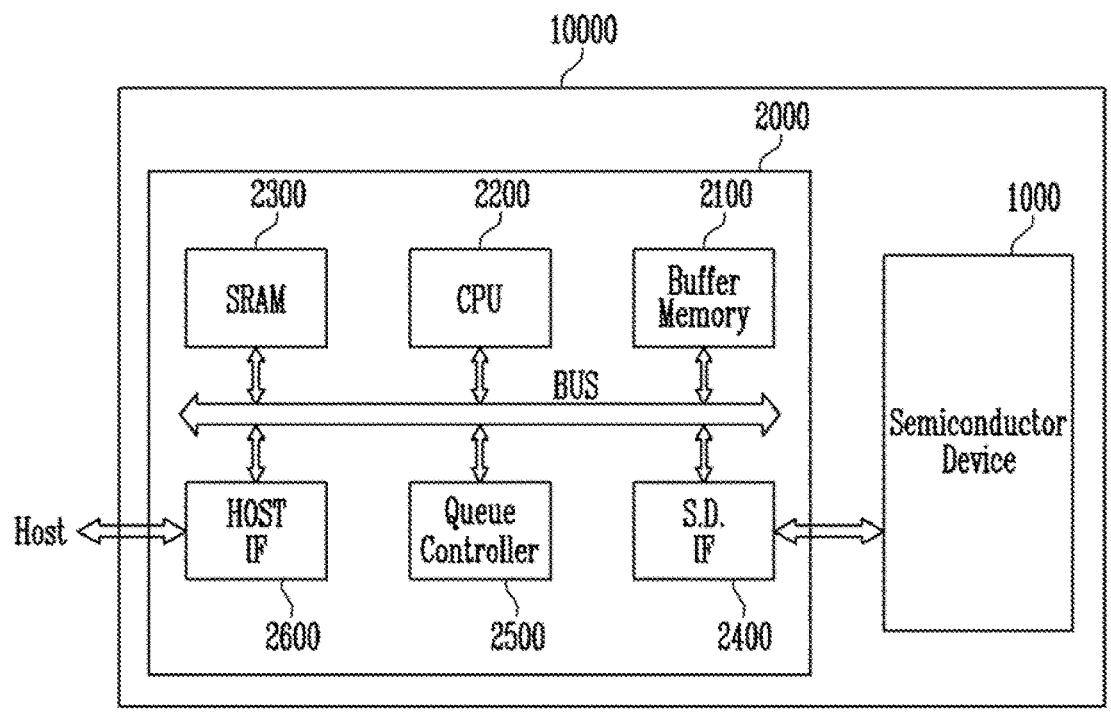
FIG. 1 is a block diagram illustrating a memory system according to an embodiment of the present disclosure.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present.

Hereinafter, embodiments will be described with reference to the accompanying drawings. Embodiments are described herein with reference to cross-sectional illustrations that are schematic illustrations of embodiments and intermediate structures. As such, variations from the shapes of the illustrations as a result, for example, of manufacturing techniques and/or tolerances, are to be expected. Thus, embodiments should not be construed as limited to the particular shapes of regions illustrated herein but may include deviations in shapes that result, for example, from manufacturing. In the drawings, lengths and sizes of layers and regions may be exaggerated for clarity. Like reference numerals in the drawings denote like elements.

Terms such as "first" and "second" may be used to describe various components, but they should not limit the various components. Those terms are only used for the purpose of differentiating a component from other components. For example, a first component may be referred to as a second component, and a second component may be referred to as a first component and so forth without departing from the spirit and scope of the present disclosure. Furthermore, "and/or" may include any one of or a combination of the components mentioned.

Furthermore, a singular form may include a plural from as long as it is not specifically mentioned in a sentence. Furthermore, "include/comprise" or "including/comprising" used in the specification represents that one or more components, steps, operations, and elements exist or are added.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

It is also noted that in this specification, "connected/coupled" refers to one component not only directly coupling another component but also indirectly coupling another component through an intermediate component. Alternatively, "directly connected/directly coupled" refers to one component directly coupling another component without an intermediate component.

FIG. 1 is a block diagram illustrating a memory system 10000 according to an embodiment of the present disclosure.

Referring to FIG. 1, the memory system 10000 may include a semiconductor device 1000 and a memory controller 2000 that is capable of controlling the semiconductor device 1000.

The memory controller 2000 may control data exchange between a host and the semiconductor device 1000. For example, the memory controller 2000 may execute a descriptor in which various tasks are included in response to a request from the host. For example, the tasks may correspond to internal commands for processing a program operation, a read operation or an erase operation. The semiconductor device 1000 may perform various operations, such as the program operation, the read operation and the erase operation, depending on a task. To perform these operations, the memory controller 2000 may include a buffer memory 2100, a Central Processing Unit (CPU) 2200, a Static Random Access Memory (SRAM) 2300, a Semiconductor Device Interface (S.D. IF) 2400, a queue controller 2500, and a host interface 2600. These devices included in the memory controller 2000 may communicate with each other via a bus. In addition to the above-mentioned devices, the memory controller 2000 may further include various devices required for operations.

The above-mentioned devices will be explained in detail as follows.

The buffer memory 2100 may temporarily store data used when the memory controller 2000 controls the semiconductor device 1000. For example, the buffer memory 2100 may temporarily store original data used for a program operation or data frequently used when the memory controller 2000 performs operations.

The CPU 2200 may control communication between the buffer memory 2100, the SRAM 2300, the semiconductor device interface 2400, the queue controller 2500, and the host interface 2600 through the bus. For example, the CPU 2200 may control operations for effectively managing the semiconductor device 1000, for example, wear-leveling, garbage collection, read refresh, and the like. The CPU 2200 may select a descriptor in response to a task queue received from the queue controller 2500, and may sequentially process tasks included in the selected descriptor. The tasks output from the CPU 2200 may be sent to the semiconductor device 1000. The semiconductor device 1000 may perform operations based on the received tasks, and may output feedback data representing whether each of the operations has been completed. Based on the feedback data, the CPU 2200 may determine whether the tasks are completed or whether an error occurred in the tasks. When it is determined that an error occurred in some tasks, the CPU 2200 may detect the tasks in which the error occurred, and may reprocess the detected tasks. Various kinds of errors may occur when a task is processed. For example, such errors may include a low voltage detection error and the like.

The SRAM 2300 may be used as the operation memory of the CPU 2200. The operation memory may be implemented using a different kind of volatile memory from the SRAM 2300, or a non-volatile memory such as a Read-Only Memory (ROM).

The semiconductor device interface 2400 may send the tasks and the feedback data between the memory controller 2000 and the semiconductor device 1000. For example, the semiconductor device interface 2400 may send the semiconductor device 1000 the tasks output from the CPU 2200. Also, the semiconductor device interface 2400 may send the CPU 2200 the feedback data output from the semiconductor device 1000.

The queue controller 2500 may output the task queue in response to a command received from the host. The task queue may be sent to the CPU 2200. For example, the queue controller 2500 may output a task queue which is fixed in terms of hardware. The task queue may include information about a descriptor.

The host interface 2600 may transmit external commands and data between the host and the memory controller 2000.

The semiconductor device 1000 may be implemented as a volatile memory-based storage device or a non-volatile memory-based storage device. For example, the volatile memory-based storage device may include a Static Random Access Memory (SRAM) and a Dynamic Random Access Memory (DRAM). For example, the non-volatile memory-based storage device may be implemented as a flash memory device, an embedded multimedia card (eMMC), Universal Flash Storage (UFS), a Solid State Drive (SSD), a Redundant Array of Independent Disks (RAID) or a Redundant Array of Inexpensive Disks (RAID), an Electrically Erasable Programmable Read-Only Memory (EEPROM), a Magnetic RAM (MRAM), a spin-transfer torque MRAM, a Conductive Bridging RAM (CBRAM), a Ferroelectric RAM (FeRAM), a Phase change RAM (PRAM), a Resistive RAM (RRAM), a Nanotube RRAM, a Polymer RAM (PoRAM), a Nano Floating Gate Memory (NFGM), a holographic memory, a molecular electronics memory device, an insulator resistance change memory, or the like.

Figure 2:
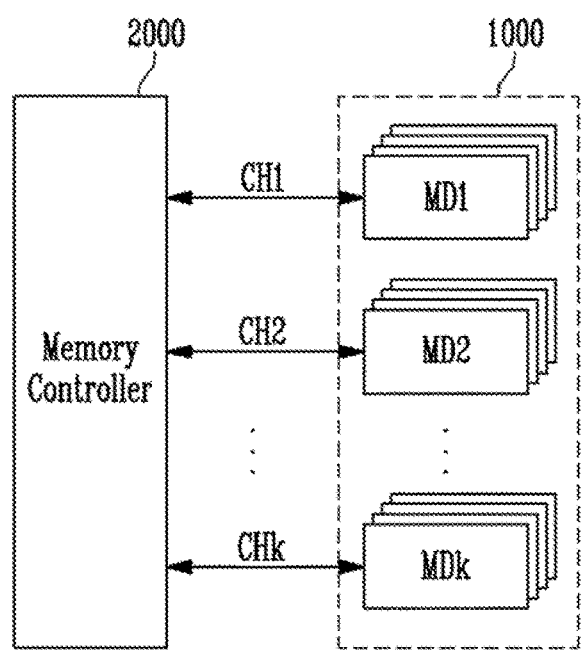
FIG. 2 is a view for explaining a coupling between a memory controller and a semiconductor device illustrated in FIG. 1.

FIG. 2 is a view for explaining a coupling between the memory controller 2000 and the semiconductor device 1000 illustrated in FIG. 1.

Referring to FIG. 2, the semiconductor device 1000 may include a plurality of memory device groups MD1 to MDk, where k is an integer greater than 1. Each of the memory device groups MD1 to MDk may include a plurality of memory devices. Each of the memory device groups MD1 to MDk may communicate with the memory controller 2000 via a corresponding one of channels CH1 to CHk. For example, the first memory device group MD1 may communicate with the memory controller 2000 via the first channel CH1.

Figure 3:
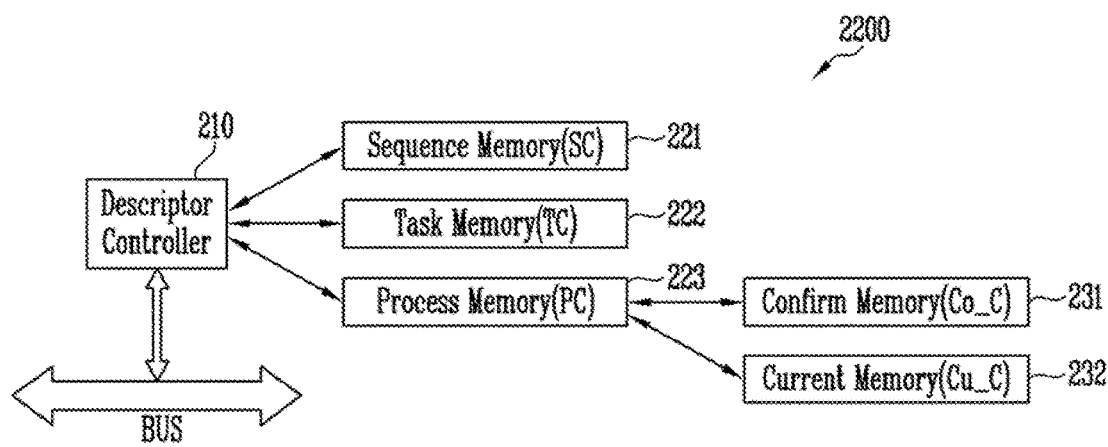
FIG. 3 is a view for explaining a central processing unit (CPU) illustrated in FIG. 1.

FIG. 3 is a view for explaining the CPU 2200 illustrated in FIG. 1.

Referring to FIG. 3, the CPU 2200 may include a descriptor controller 210 and a plurality of memories 221, 222, 223, 231, and 232. The memories 221, 222, 223, 231, and 232 may store various tasks included in a descriptor and various codes necessary for processing the descriptor. The descriptor controller 210 may control the memories 221, 222, 223, 231, and 232 in response to a task queue. The memories 221, 222, 223, 231, and 232 may include a sequence memory 221, a task memory 222, a process memory 223, a confirm memory 231, and a current memory 232.

The task memory 222 may store various tasks TC included in the descriptor. For example, the tasks TC stored in the task memory 222 may include commands for various operations performed in the semiconductor device (1000 of FIG. 1). The sequence memory 221 may store a sequence code SC having information about a processing sequence of the tasks TC. For example, the sequence code SC may be updated by the descriptor controller 210 whenever the descriptor is executed. The process memory 223 may store a process code PC having information about tasks whose operations have been completed, among the tasks TC. For example, the process code PC may be updated by the descriptor controller 210 in an order in which the operations are completed.

The confirm memory 231 may store a confirm code Co_C having information about a section in which an operation has been completed without an error. The current memory 232 may store a current code Cu_C having information about a section in which an error occurred. For example, tasks included in a descriptor may be consecutively processed on a certain section basis. The semiconductor device 1000 may perform operations depending on the received tasks. When an operation of the last task in a selected section is finished, the semiconductor device 1000 may check whether an error occurred in the operations performed depending on the tasks in the selected section, and may output feedback data as a result of checking. The feedback data may include information about whether or not an error occurred. If no error occurred in the selected section, the confirm code Co_C may be set in the last task in the selected section. If any error occurred in the selected section, the current code Cu_C may be set in the last task in the selected section. That is, after all of the operations based on the tasks in the selected section were performed, if the confirm code Co_C is assigned to the last task, this indicates that no error occurred in the tasks in the selected section. However, after all of the operations based on the tasks in the selected section were performed, if the current code Cu_C is assigned to the last task, this indicates that an error occurred in some tasks among the tasks in the selected section.

The descriptor controller 210 may update the sequence code SC depending on information about tasks included in a previously executed descriptor. For example, depending on processing states of the tasks of the previously executed descriptor, the descriptor controller 210 may rearrange the processing sequence of the tasks, and may assign the sequence code SC to each of the tasks depending on the rearranged sequence. For example, the descriptor controller 210 may rearrange a sequence code SC depending on an operation time of each of the tasks or on a state of the semiconductor device 1000 for processing the corresponding task, and may store the rearranged sequence code SC mapped to each of the tasks in the sequence memory 221. Also, the descriptor controller 210 may store the process code PC, the confirm code Co_C, and the current code Cu_C in the respective memories 223, 231, and 232, based on the feedback data received from the semiconductor device 1000.

The above-mentioned descriptor will be described in detail as follows.

Figure 4:
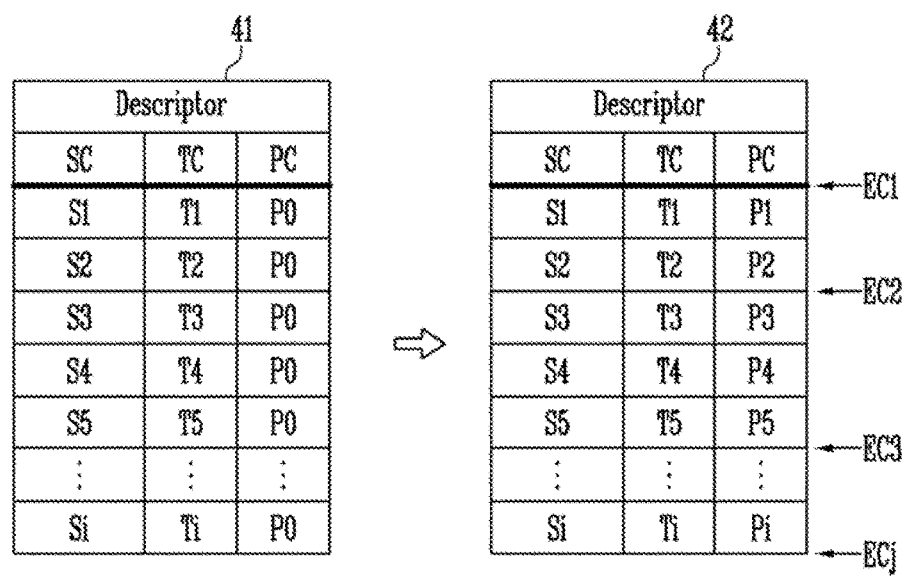
FIG. 4 is a view for explaining a descriptor according to an embodiment of the present disclosure.

FIG. 4 is a view describing a descriptor according to an embodiment of the present disclosure.

Referring to FIG. 4, in an initial descriptor 41 before no operation is performed, first to i-th sequence codes S1 to Si, i being an integer greater than 1, for determining the processing sequence of tasks may be assigned to first to i-th tasks T1 to Ti, respectively. Since the initial descriptor 41 is in the state in which no operation is performed, all process codes PC may be set to an initial code P0.

The first to i-th tasks T1 to Ti of the descriptor may be sequentially processed according to the first to i-th sequence codes S1 to Si assigned thereto. For example, when the first sequence code S1 indicates the first sequence, and the i-th sequence code Si indicates the last sequence, among the first to i-th sequence codes S1 to Si, then the first task T1 may be processed first according to the first sequence code S1, and the second task T2 may be processed subsequent thereto according to the second sequence code S2. In this manner, the first to i-th tasks T1 to Ti may be sequentially processed, and the semiconductor device 1000 may sequentially perform operations corresponding to each of the first to i-th tasks T1 to Ti.

The semiconductor device 1000 may output feedback data whenever each operation is completed, and the descriptor controller 210 may store first to i-th process codes P1 to Pi for the first to i-th tasks T1 to Ti in the process memory (223 in FIG. 3) based on the feedback data. Accordingly, after the initial descriptor 41 is executed, the first to i-th process codes P1 to Pi may be assigned to the first to i-th tasks T1 to Ti, in a descriptor 42.

All of the first to i-th tasks T1 to Ti included in the descriptor 42 may be divided based on a preset section, and after tasks included in each section are consecutively processed, an error checking operation is performed. When it is determined that no error occurred, tasks included in the next section may be consecutively processed. For example, when the first and second tasks T1 and T2 are included in a first section between a first error check point EC1 and a second error check point EC2, the third to fifth tasks T3 to T5 are included in a second section between the second error check point EC2 and a third error check point EC3, then the remaining tasks, that is, the sixth to i-th tasks T6 to Ti, may be divided into multiple sections.

The first and second tasks T1 and T2, included in the first section between the first error check point EC1 and the second error check point EC2, may be sequentially processed according to the first and second sequence codes S1 and S2. For example, after the first task T1 is processed, the first process code P1 for the first task T1 may be stored in the process memory 223, and after the second task T2 is processed, the second process code P2 for the second task T2 may be stored in the process memory 223. When the first and second tasks T1 and T2 have been completed without an error, a confirm code Co_C may be stored in the confirm memory (231 in FIG. 3) at the second error check point EC2. Subsequently, the third to fifth tasks T3 to T5, included in the second section between the second error check point EC2 and the third error check point EC3, may be sequentially processed according to the third to fifth sequence codes S3 to S5. If no error occurred in all the operations for the third to fifth tasks T3 to T5, the third to fifth process codes P3 to P5 for the third to fifth tasks T3 to T5 are stored in the process memory 223, and a confirm code Co_C may be stored at the third error check point EC3.

If an error occurred in any task, among the third to fifth tasks T3 to T5, a process code for the task in which the error occurred is not updated. That is, the previous process code of the task may be maintained. Additionally, a current code Cu_C may be stored at the third error check point EC3. The descriptor controller (210 in FIG. 3) performs an error section checking operation and a reprocessing operation for the tasks in the section in which the error occurred, and may then control the descriptor to process tasks included in the next section when no error occurred in the reprocessing operation.

A method for detecting tasks in which an error occurred and reprocessing the detected tasks will be described in detail as follows.

Figure 5:
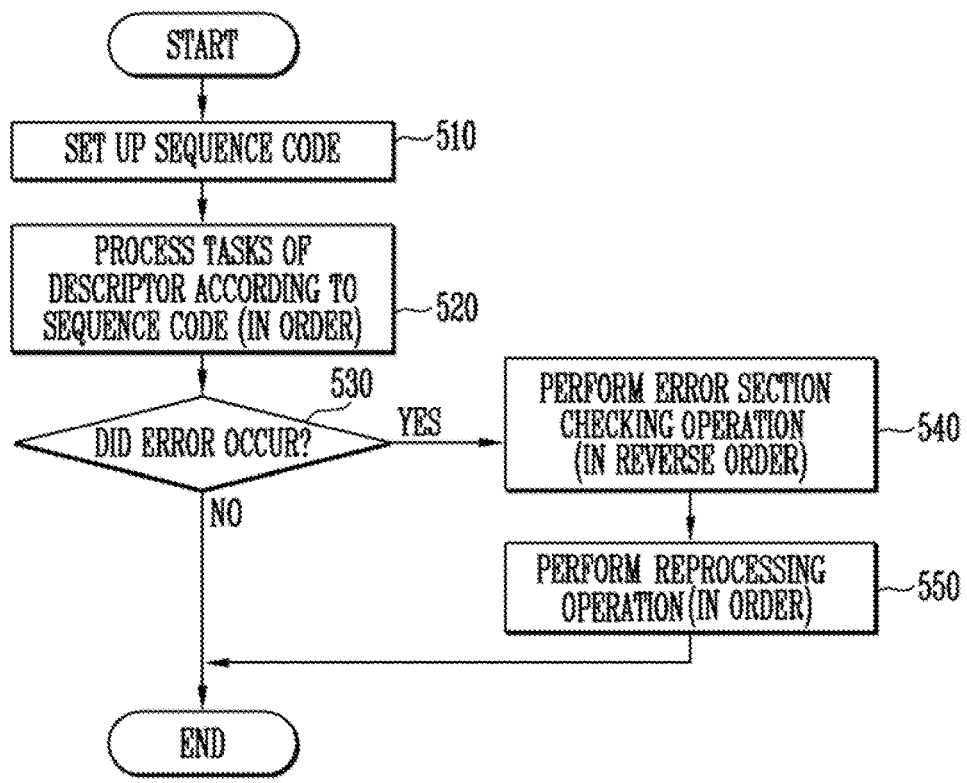
FIG. 5 is a flowchart for explaining a method for operating a memory system according to an embodiment of the present disclosure.

FIG. 5 is a flowchart for explaining a method for operating a memory system according to an embodiment of the present disclosure.

Referring to FIG. 5, the descriptor controller (210 in FIG. 3) may set up a sequence code SC at step 510. For example, the sequence code SC may be updated by the descriptor controller 210 whenever the descriptor is executed. Accordingly, the processing sequence in which tasks included in the descriptor are to be processed may be changed according to the updated sequence code SC.

The descriptor controller 210 may sequentially process tasks of the descriptor to be processed in the semiconductor device (1000 in FIG. 1) according to the sequence code SC at step 520. Here, the processing sequence in which the tasks are to be processed is in a forward direction.

When all the tasks included in a certain section are processed, it is determined whether an error occurred in the processed tasks at step 530. If no error occurred in the processed tasks (NO at step 530), the operations for the tasks are terminated. When the operations for the tasks are terminated, tasks included in the next section may be processed.

If an error occurred in the processed tasks (YES at step 530), an error section checking operation may be performed at step 540. For example, the error section checking operation may be performed in reverse order of the sequence code SC. That is, the error section checking operation may be performed in such a way that the tasks within a section between a point at which the current code Cu_C is input and a point at which the confirm code Co_C is input are performed in reverse order of the sequence code SC. The descriptor controller 210 may check the process code PC corresponding to each of the tasks. For example, a process code PC is updated when the operation corresponding to a task has been completed without an error, but the process code is not updated in the task in which an error occurred. Accordingly, in the task in which an error occurred, the previous process code may be maintained. That is, since tasks are sequentially processed according to sequence codes SC, process codes PC may not be updated in the tasks from the task in which an error occurred. Therefore, when process codes PC are checked in reverse order of the sequence code SC, the process code PC that is not updated may overlap one of updated process codes PC. That is, a task, the process code PC of which overlaps the process code PC of another task, may be detected.

Tasks may be reprocessed according to the sequence code SC from the task having an overlapping process code PC at step 550. For example, when a task having an overlapping process code PC is detected at step 540, the descriptor controller 210 may sequentially process tasks from the detected task according to the sequence code SC.

The above-mentioned steps will be described in detail with reference to FIGS. 6 to 10.

Figure 6:
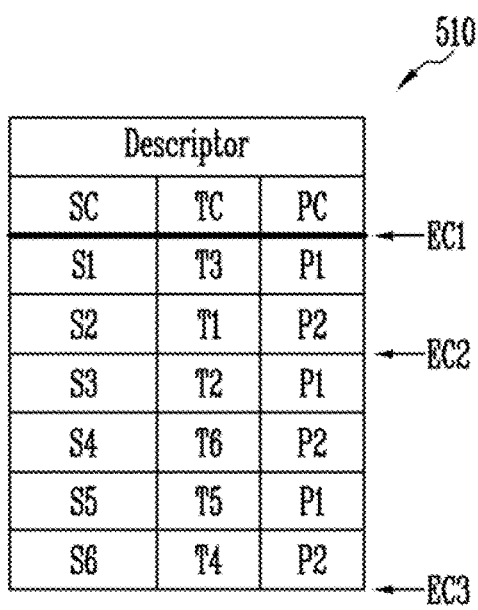
FIG. 6 is a view for explaining an operation of setting up a sequence code of FIG. 5.

FIG. 6 is a view for explaining an operation for setting up the sequence code at step 510 in FIG. 5.

Referring to FIG. 5 and FIG. 6, the sequence code SC may be set depending on the processing states of tasks included in the descriptor. For example, when the first sequence code S1 is set in the third task T3, the second sequence code S2 is set in the first task T1, the third sequence code S3 is set in the second task T2, the fourth sequence code S4 is set in the sixth task T6, the fifth sequence code S5 is set in the fifth task T5, and the sixth sequence code S6 is set in the fourth task T4. Furthermore, a first section between a first error check point EC1 and a second error check point EC2, and a second section between the second error check point EC2 and a third error check point EC3 may be set. For example, the first error check point EC1 may be set at a point at which the third task T3, which is to be processed first according to the first sequence code S1, starts, the second error check point EC2 may be set at a point at which the first task T1, which is to be processed according to the second sequence code S2, ends, and the third error check point EC3 may be set at a point at which the fourth task T4, which is to be processed according to the sixth sequence code S6, ends. Since the number and sequence of the first to sixth sequence codes S1 to S6, the first to sixth tasks T1 to T6 corresponding thereto, and the first and second sections are an example to help understand the present disclosure, these may be set differently depending on a memory system.

FIG. 7 is a view for explaining an operation for processing tasks of the descriptor according to sequence code at step 520 in FIG. 5.

Referring to FIG. 5 and FIG. 7, the third and first tasks T3 and T1 may be processed in the order 71 of the sequence codes from the first sequence code S1 to the second sequence code S2. After the third and first tasks T3 and T1 included in the first section are consecutively processed, an error checking operation is performed. When the third task T3 is processed without an error, the process code PC of the third task T3 may be updated to the first process code P1. Subsequently, when the first task T1 is also processed without an error, the process code PC of the first task T1 may be updated to the second process code P2.

Since no error occurred in the third and first tasks T3 and T1, a first confirm code Co_C1 may be stored at the second error check point EC2.

FIG. 8 is a view for explaining a case in which an error occurred during processing tasks of the descriptor at step 530 in FIG. 5.

Referring to FIG. 5 and FIG. 8, when no error occurred in the third and first tasks T3 and T1 which have been processed in the first section between the first error check point EC1 and the second error check point EC2, the second, sixth, fifth, and fourth tasks T2, T6, T5, and T4, included in the second section between the second error check point EC2 and the third error check point EC3, may be sequentially processed according to the third to sixth sequence codes S3 to S6 (at step 520 in FIG. 5).

After the second, sixth, fifth, and fourth tasks T2, T6, T5 and T4 included in the second section are consecutively processed, an error checking operation is performed. When an error occurs in the fifth task T5, among the second, sixth, fifth, and fourth tasks T2, T6, T5 and T4, which are sequentially processed, then the descriptor controller 210 detects the occurrence of an error at the third error check point EC3, and may store a first current code Cu_C1 at the third error check point EC3.

Figure 9:
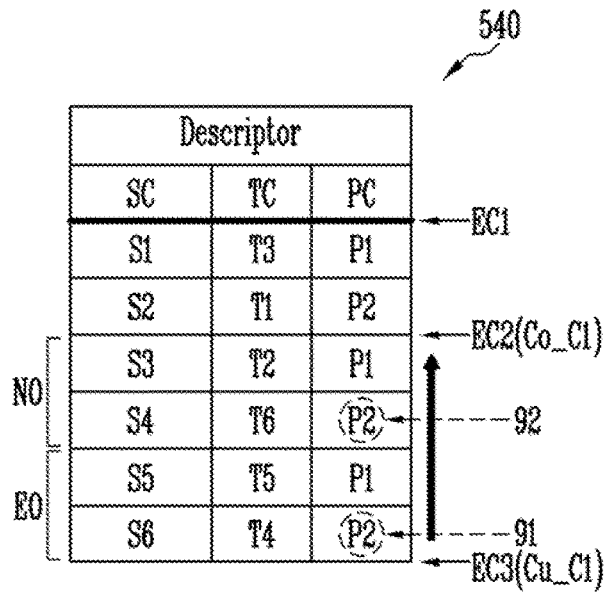
FIG. 9 is a view for explaining an error section checking operation in FIG. 5.

FIG. 9 is a view describing the error section checking operation at step 540 in FIG. 5.

Referring to FIG. 5 and FIG. 9, the error section checking operation may be performed in the order from the third error check point EC3 at which the first current code Cu_C1 is stored, to the second error check point EC2 at which the first confirm code Co_C1 is stored. That is, the error section checking operation may be performed in reverse order of the sequence code SC. Since a case in which an error occurred in the fifth task T5 is illustrated in FIG. 8, the second and sixth tasks T2 and T6 are processed without an error. Accordingly, the process code PC of the second task T2 may be updated to the first process code P1, and the process code PC of the sixth task T6 may be updated to the second process code P2. However, since it is difficult to determine the task in which the error occurred, among the fifth and fourth tasks T5 and T4, processed after the sixth task T6, the error section checking operation may be performed in reverse order of the sequence code SC. This is intended to check the process code that is not updated, since the process code PC of the task in which an error occurred is not updated. Particularly, since the process code PC that is not updated, may overlap the previously updated process code PC, the tasks having an overlapping process codes PC are detected during the error section checking operation.

The descriptor controller 210 may check the process code PC corresponding to the fourth task T4. In the present embodiment, the second process code P2 is stored in the fourth task T4. Subsequently, the descriptor controller 210 may check the process code PC corresponding to the fifth task T5. If the first process code P1 is stored in the fifth task T5, the descriptor controller 210 compares the first process code P1 stored in the fifth task T5 with the second process code P2 stored in the fourth task T4. Since the first process code P1 is different from the second process code P2, the descriptor controller 210 may compare the process code PC of the sixth task T6 with the process codes PC of the fourth and fifth tasks T4 and T5. When the process code PC 92 stored in the sixth task T6 overlaps the process code PC 91 stored in the fourth task T4, the descriptor controller 210 may determine that an error occurred in the tasks processed after the sixth task T6, that is, the fifth or fourth task T5 or T4. Accordingly, the descriptor controller 210 places the second and sixth tasks T2 and T6 in a normal operation group NO, which is a group of tasks in which operations are performed normally, and places the fifth and fourth tasks T5 and T4 in an error operation group EO, which is a group of tasks in which an error occurred.

Figure 10:
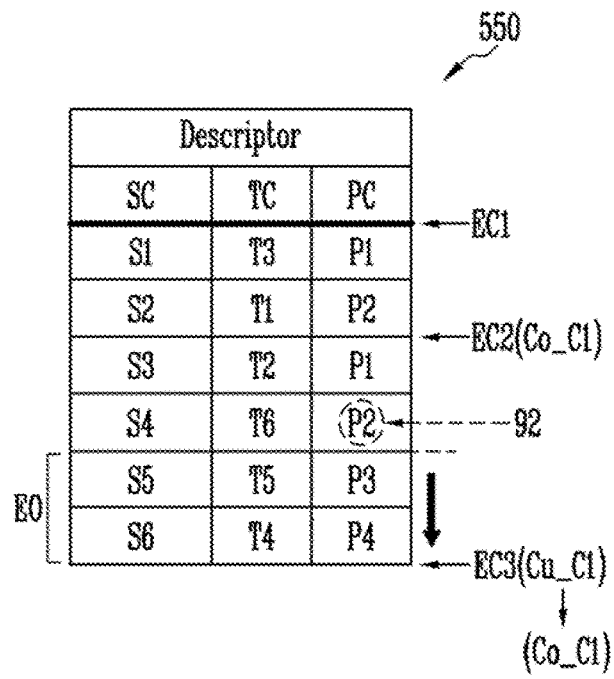
FIG. 10 is a view for explaining a reprocessing operation in FIG. 5.

FIG. 10 is a view for explaining a reprocessing operation at step 550 in FIG. 5.

Referring to FIG. 5 and FIG. 10, the descriptor controller 210 may sequentially reprocess the fifth and fourth tasks T5 and T4 included in the error operation group EO in the order of the sequence code SC. For example, when the reprocessed operation on the fifth task T5 is completed without an error, the process code PC of the fifth task T5 may be updated to the third process code P3 following on the second process code P2 of the sixth task T6. Then, when the reprocessed operation on the fourth task T4 is completed without an error, the process code PC of the fourth task T4 may be updated to the fourth process code P4 following on the third process code P3 of the fifth task T5. When the process code PC of the fourth task T4 is updated, an error checking operation may be performed again at the third error check point EC3. When it is determined that no error occurred by the error checking operation, the descriptor controller 210 may store a second confirm code Co_C2 at the third error check point EC3 at which the first current code Cu_C1 was stored. For example, the first current code Cu_C1 may be reset, and the second confirm code Co_C2 may be newly stored.

Although the embodiment in which four tasks are included in the section in which the error occurred hereinafter, referring to as an "error check section" has been described with reference to FIGS. 6 to 10, the number of tasks may be set differently depending on a memory system. In this regard, a method for processing a descriptor in which more tasks are included in an error check section will be described based on the above-mentioned techniques.

FIGS. 11 to 13 are views for explaining an operating method according to an embodiment of the present disclosure. In the present embodiment, an error check section between an a-th error check point ECa and a b-th error check point ECb, a and b being positive integers, is set, and nine tasks are included in the error check section between the a-th error check point ECa and the b-th error check point ECb in FIGS. 11 to 13. Furthermore, in the present embodiment, a c-th confirm code Co_Cc is stored at the a-th error check point ECa. Also, in the present embodiment, 10-th to 18-th sequence codes S10 to S18 are set in 20-th to 28-th tasks T20 to T28, respectively, and the 20-th to 28-th tasks T20 to T28 are sequentially processed according to the 10-th to 18-th sequence codes S10 to S18.

Referring to FIG. 11, when the 20-th to 28-th tasks T20 to T28 are sequentially processed, the semiconductor device 1000 may perform operations based on the 20-th to 28-th tasks T20 to T28 and output feedback data whenever each of the operations is terminated. The descriptor controller 210 may update the process code PC of each of the tasks depending on the feedback data. After the operation for the 28-th task T28 is terminated, an error checking operation is performed at the b-th error check point ECb. When it is determined that an error occurred in the error check section, the descriptor controller 210 may store the c-th current code Cu_Cc at the b-th error check point ECb. The descriptor controller 210 may perform an error section checking operation to detect a task or tasks in which the error occurred, among the 20-th to 28-th tasks T20 to T28.

Referring to FIG. 12, the error section checking operation may be performed from the last processed task, that is, the 28-th task T28, in reverse order of the sequence code SC. After checking that the process code PC of the 28-th task T28 is the third process code P3, the descriptor controller 210 may compare the process code PC of the 27-th task T27 with the process code PC of the 28-th task T28.

Since the process code PC of the 27-th task T27 is the second process code P2, the process codes P2 and P3 of the 27-th and 28-th tasks do not overlap each other. Accordingly, the descriptor controller 210 may compare the process code PC of the 26-th task T26 with the process codes P2 and P3 of the 27-th and 28-th tasks.

Since the process code PC of the 26-th task T26 is the fifth process code P5, the fifth process code P5 of the 26-th task T26 does not overlap any one of the process code P2 and P3 of the 27-th and 28-th tasks T27 and T28. Accordingly, the descriptor controller 210 may compare the process code PC of the next task, which is the 25-th task T25, with the process codes P5, P2 and P3 of the 26-th to 28-th tasks T26 to T28.

Since the process code PC of the 25-th task T25 is the eighth process code P8, the eighth process code P8 of the 25-th task T25 does not overlap any one of the process codes P5, P2 and P3 of the 26-th to 28-th tasks T26 to T28. Accordingly, the descriptor controller 210 may compare the process code PC of the 24-th task T24 with the process codes P8, P5, P2, and P3 of the 25-th to 28-th tasks T25 to T28.

Since the process code PC of the 24-th task T24 is the fifth process code P5, the descriptor controller 210 may determine that the process code PC 122 of the 24-th task T24 overlaps the process code PC 121 of the 26-th task T26.

Accordingly, the descriptor controller 210 may place the 20-th to 24-th tasks T20 to T24 in a normal operation group NO, and may place the 25-th to 28-th tasks T25 to T28 in an error operation group EO.

Referring to FIG. 13, the descriptor controller 210 may sequentially reprocess the 25-th to 28-th tasks T25 to T28, included in the error operation group EO, in the order of the sequence code SC. If the 25-th to 28-th tasks are reprocessed without an error, the process codes PC for the 25-th to 28-th tasks T25 to T28 may be updated to the sixth to ninth process codes P6 to P9. When the process code PC of the 25-th to 28-th tasks T25 to T28 is updated, an error checking operation may be performed again at the b-th error check point ECb. When it is determined that no error occurred by the error checking operation, the descriptor controller 210 may store a d-th confirm code Co_Cd at the b-th error check point ECb at which the c-th current code Cu_Cc was stored.

As described above, since a section in which an error occurred may be quickly detected in the tasks being processed in the descriptor, and the tasks in which the error occurred may be reprocessed, the reliability and operation speed of a memory system may be improved.

Figure 14:
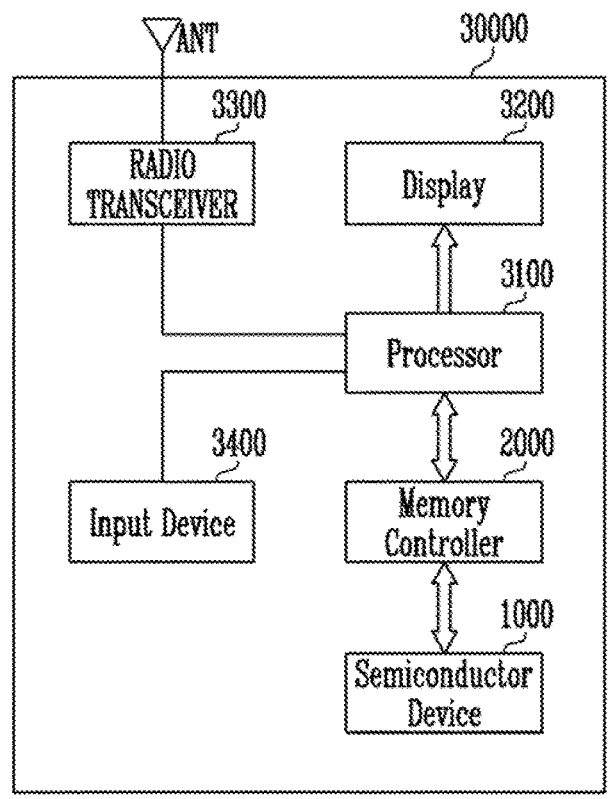
FIG. 14 is a view for explaining an example of a memory system including the memory controller illustrated in FIG. 1.

FIG. 14 is a view for explaining an example of a memory system 30000 including the memory controller illustrated in FIG. 1.

Referring to FIG. 14, the memory system 30000 may be implemented in the form of a cellular phone, a smart phone, a tablet PC, a Personal Digital Assistant (PDA), or a wireless communication device. The memory system 30000 may include a semiconductor device 1000 and a memory controller 2000 that is capable of controlling the operation of the semiconductor device 1000. The memory controller 2000 may control the data access operation of the semiconductor device 1000, for example, a program operation, an erase operation, or a read operation, under the control of a processor 3100. The semiconductor device 1000 and the memory controller 2000 of FIG. 14 may have substantially the same structures as those of the memory system shown in FIG. 1. The memory controller 2000 may detect an error in a descriptor being executed, and may reprocess tasks in a section in which an error occurred.

The data programmed in the semiconductor device 1000 may be output via a display 3200 under the control of the memory controller 2000.

A radio transceiver 3300 may transmit and receive wireless signals via an antenna ANT. For example, the radio transceiver 3300 may transform a wireless signal received via the antenna ANT into a signal that can be processed in the processor 3100. Accordingly, the processor 3100 may process the signal output from the radio transceiver 3300, and may send the processed signal to the memory controller 2000 or the display 3200. The memory controller 2000 may program the signal, processed by the processor 3100, into the semiconductor device 1000. Also, the radio transceiver 3300 may transform a signal output from the processor 3100 into a wireless signal, and may output the wireless signal to an external device via the antenna ANT. An input device 3400 is a device through which a control signal for controlling the operation of the processor 3100 or data to be processed by the processor 3100 can be input, and may be implemented in the form of a pointing device, such as a touch pad or a computer mouse, a keypad, or a keyboard. The processor 3100 may control the operation of the display 3200 so that data output from the memory controller 2000, data output from the radio transceiver 3300, or data output from the input device 3400 may be output via the display 3200.

According to an embodiment, the memory controller 2000 capable of controlling the operation of the semiconductor device 1000 may be implemented as a part of the processor 3100, or may be implemented as a chip that is separate from the processor 3100.

Figure 15:
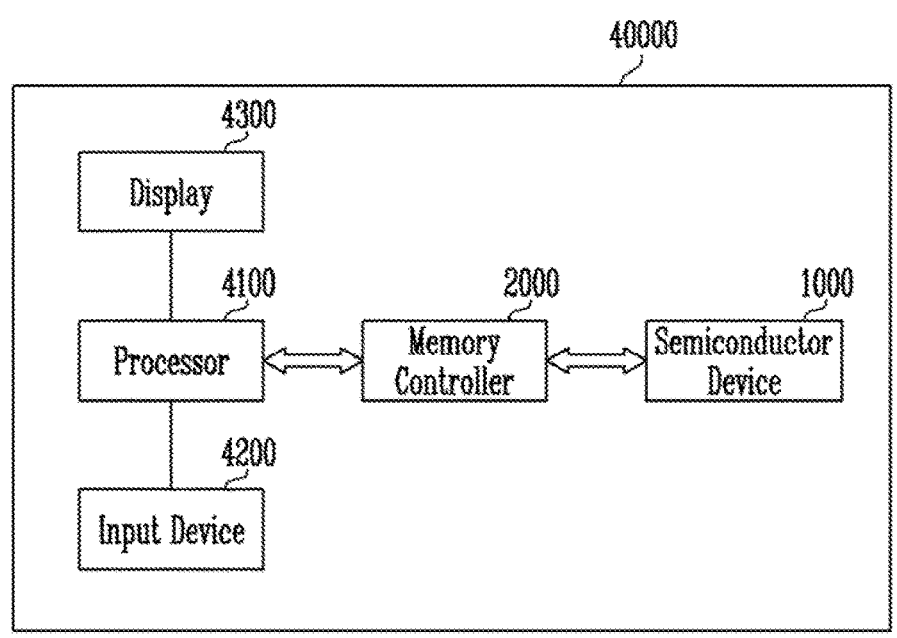
FIG. 15 is a view for explaining an example of a memory system including the memory controller illustrated in FIG. 1.

FIG. 15 is a view for explaining an example of a memory system 40000 including the memory controller illustrated in FIG. 1.

Referring to FIG. 15, the memory system 40000 may be implemented in the form of a personal computer (PC), a tablet PC, a net-book, an e-reader, a Personal Digital Assistant (PDA), a Portable Multimedia Player (PMP), an MP3 player, or an MP4 player.

The memory system 40000 may include a semiconductor device 1000 and a memory controller 2000 that is capable of controlling the data processing operation of the semiconductor device 1000. The semiconductor device 1000 and the memory controller 2000 of FIG. 15 may have substantially the same structures as those of the memory system shown in FIG. 1.

A processor 4100 may output data stored in the semiconductor device 1000 via a display 4300 depending on data input through an input device 4200. For example, the input device 4200 may be implemented in the form of a pointing device, such as a touch pad or a computer mouse, a key pad, or a keyboard.

The processor 4100 may control the overall operation of the memory system 40000, and may control the operation of the memory controller 2000. According to an embodiment, the memory controller 2000 capable of controlling the operation of the semiconductor device 1000 may be implemented as a part of the processor 4100, or may be implemented as a chip that is separate from the processor 4100.

Figure 16:
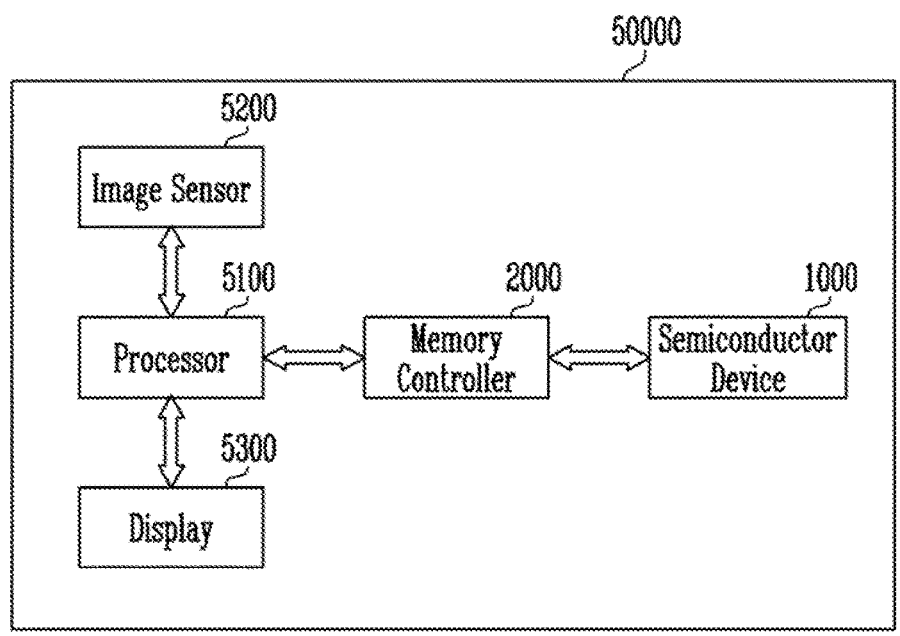
FIG. 16 is a view for explaining an example of a memory system including the memory controller illustrated in FIG. 1.

FIG. 16 is a view for explaining an example of a memory system 50000 including the memory controller illustrated in FIG. 1.

Referring to FIG. 16, the memory system 50000 may be implemented in the form of an image processing device, for example, a digital camera, a cellular phone equipped with a digital camera, a smart phone equipped with a digital camera, or a table PC equipped with a digital camera.

The memory system 50000 includes a semiconductor device 1000 and a memory controller 2000 that is capable of controlling the data processing operation of the semiconductor device 1000, for example, a program operation, an erase operation, or a read operation. The semiconductor device 1000 and the memory controller 2000 of FIG. 16 may have substantially the same structures as those of the memory system shown in FIG. 1.

An image sensor 5200 of the memory system 50000 may transform an optical image into digital signals, and the transformed digital signals may be sent to the processor 5100 or the memory controller 2000. Under the control of the processor 5100, the transformed digital signals may be output via a display 5300, or may be stored in the semiconductor device 1000 through the memory controller 2000.

Also, the data stored in the semiconductor device 1000 may be output via the display 5300 under the control of the processor 5100 or the memory controller 2000.

According to an embodiment, the memory controller 2000 capable of controlling the operation of the semiconductor device 1000 may be implemented as a part of the processor 5100 or a chip that is separate from the processor 5100.

Figure 17:
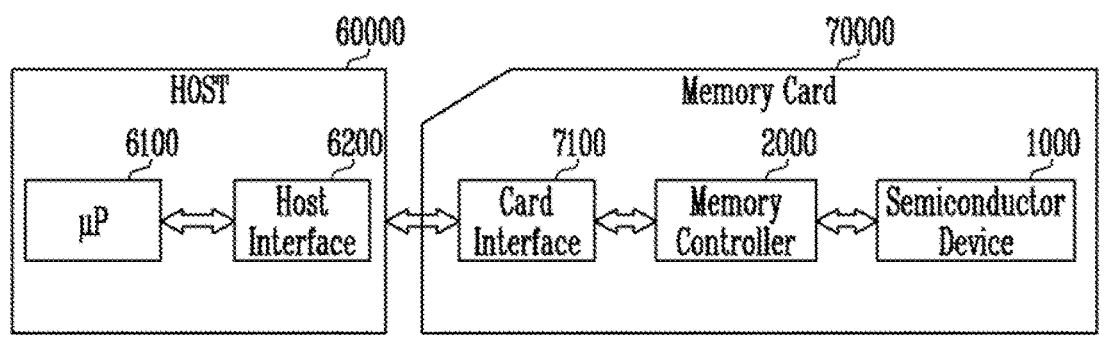
FIG. 17 is a view for explaining an example of a memory system including the memory controller illustrated in FIG. 1.

FIG. 17 is a view for explaining an example of a memory system 70000 including the memory controller illustrated in FIG. 1.

Referring to FIG. 17, the memory system 70000 may be implemented in the form of a memory card or a smart card. The memory system 70000 may include a semiconductor device 1000, a memory controller 2000, and a card interface 7100.

The memory controller 2000 may control data exchange between the semiconductor device 1000 and the card interface 7100. According to an embodiment, the card interface 7100 may be a secure digital (SD) card interface or a multimedia card (MMC) interface, but the card interface 7100 is not limited to these examples. The semiconductor device 1000 and the memory controller 2000 of FIG. 17 may have substantially the same structures as those of the memory system shown in FIG. 1.

The card interface 7100 may control data exchange between a host 60000 and the memory controller 2000 according to the protocols of the host 60000. According to an embodiment, the card interface 7100 may support Universal Serial Bus (USB) protocols and InterChip (IC)-USB protocols. Here, the card interface may be hardware that is capable of supporting protocols used by the host 60000, software installed in the hardware, or a signal transfer method.

When the memory system 70000 is connected with a host interface 6200 of the host 60000, such as a PC, a tablet PC, a digital camera, a digital audio player, a cellular phone, console video game hardware, or a digital set-top box, the host interface 6200 may perform data communication with the semiconductor device 1000 via the card interface 7100 and the memory controller 2000, under the control of a microprocessor μP 6100.

The present disclosure may quickly detect a section in which an error occurred during the execution of a descriptor, and reprocess tasks in the detected section, whereby the reliability and operation speed of a memory system may be improved.

Examples of embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A data processing system for controlling a semiconductor device according to a command received from a host, comprising:

a queue controller configured to output a task queue in response to the command; and a processor configured to select a descriptor based on the task queue, output a plurality of tasks included in the descriptor to the semiconductor device according to a process sequence of the plurality of tasks, detect replay tasks to be reprocessed according to feedback data received from the semiconductor device, and reprocess the replay tasks, wherein the feedback data represents whether an error occurred in the plurality of tasks, wherein the descriptor includes process codes which correspond to the plurality of tasks, respectively, and wherein the processor determines the replay tasks by comparing the process codes in reverse order of the process sequence.

2. The data processing system of claim 1, wherein the error includes a low voltage detection error.

3. The data processing system of claim 1, wherein the descriptor includes a plurality of error check sections and the plurality of tasks are performed for each error check section among the plurality of error check sections.

4. The data processing system of claim 3, wherein the processor updates either a confirm code or a current code depending on whether at least one task in which an error occurred is included in a selected error check section among the plurality of error check sections.

5. The data processing system of claim 4, wherein the processor updates the confirm code for the selected error check section when the selected error check section does not include the at least one task in which the error occurred.

6. The data processing system of claim 4, wherein the processor updates the current code for the selected error check section when the selected error check section includes the at least one task in which the error occurred.

7. The data processing system of claim 4, wherein the processor includes:

a descriptor controller configured to detect the replay tasks among tasks included in the selected error check section;

a confirm memory configured to store a confirm code of an error check section in which no error has occurred among the plurality of error check sections; and a current memory configured to store a current code of an error check section in which an error has occurred among the plurality of error check sections.

8. The data processing system of claim 1, wherein the processor updates process codes corresponding to tasks in which the error did not occur.

9. The data processing system of claim 1, wherein the processor maintains process codes corresponding to tasks in which the error occurred.

10. The data processing system of claim 1, wherein the processor detects a task having a process code overlapping with a process code of a lastly performed task within the error check section by comparing the process codes in reverse order of the process sequence and determines tasks performed after the task having the process code overlapping with the process code of the lastly performed task as the replay task according to the process sequence.

11. A method for operating a data processing system which controls a semiconductor device according to a command received from a host, the method comprising:

selecting a descriptor according to the command;

outputting a plurality of tasks included in the descriptor to the semiconductor device according to a process sequence of the plurality of tasks;

receiving feedback data from the semiconductor device;

determining replay tasks to be reprocessed by comparing process codes in reverse order of the process sequence according to the feedback data; and reprocessing the replay tasks by outputting the replay tasks to the semiconductor device.

12. The method of claim 11,
wherein the error includes a low voltage detection error.

13. The method of claim 11,
wherein the descriptor includes a plurality of error check sections and the plurality of tasks are performed for each error check section among the plurality of error check sections.

14. The method of claim 13, wherein the determining comprises:

updating either a confirm code or a current code depending on whether at least one task in which an error occurred is included in a selected error check section among the plurality of error check sections;

determining the selected error check section using the confirm code and the current code;

detecting a task having a process code overlapping with a process code of a lastly performed task within the error check section by comparing the process codes in reverse order of the process sequence; and determining tasks performed after the task having the process code overlapping with the process code of the lastly performed task as the replay task according to the process sequence.

15. The method of claim 14, wherein the updating comprises updating the confirm code for the selected error check section when the selected error check section does not include the at least one task in which the error occurred.

16. The method of claim 14, wherein the updating comprises updating the current code for the selected error check section when the selected error check section includes the at least one task in which the error occurred.

17. The method of claim 11,
wherein the process codes corresponding to tasks in which the error did not occur are updated.

18. The method of claim 11,
wherein the process codes corresponding to tasks in which the error occurred are maintained.

* * * * *